Feb. 27, 1934.   R. B. HITCHCOCK   1,948,917
GATHERING MEANS FOR CORN PICKERS
Filed April 20, 1933   2 Sheets-Sheet 2
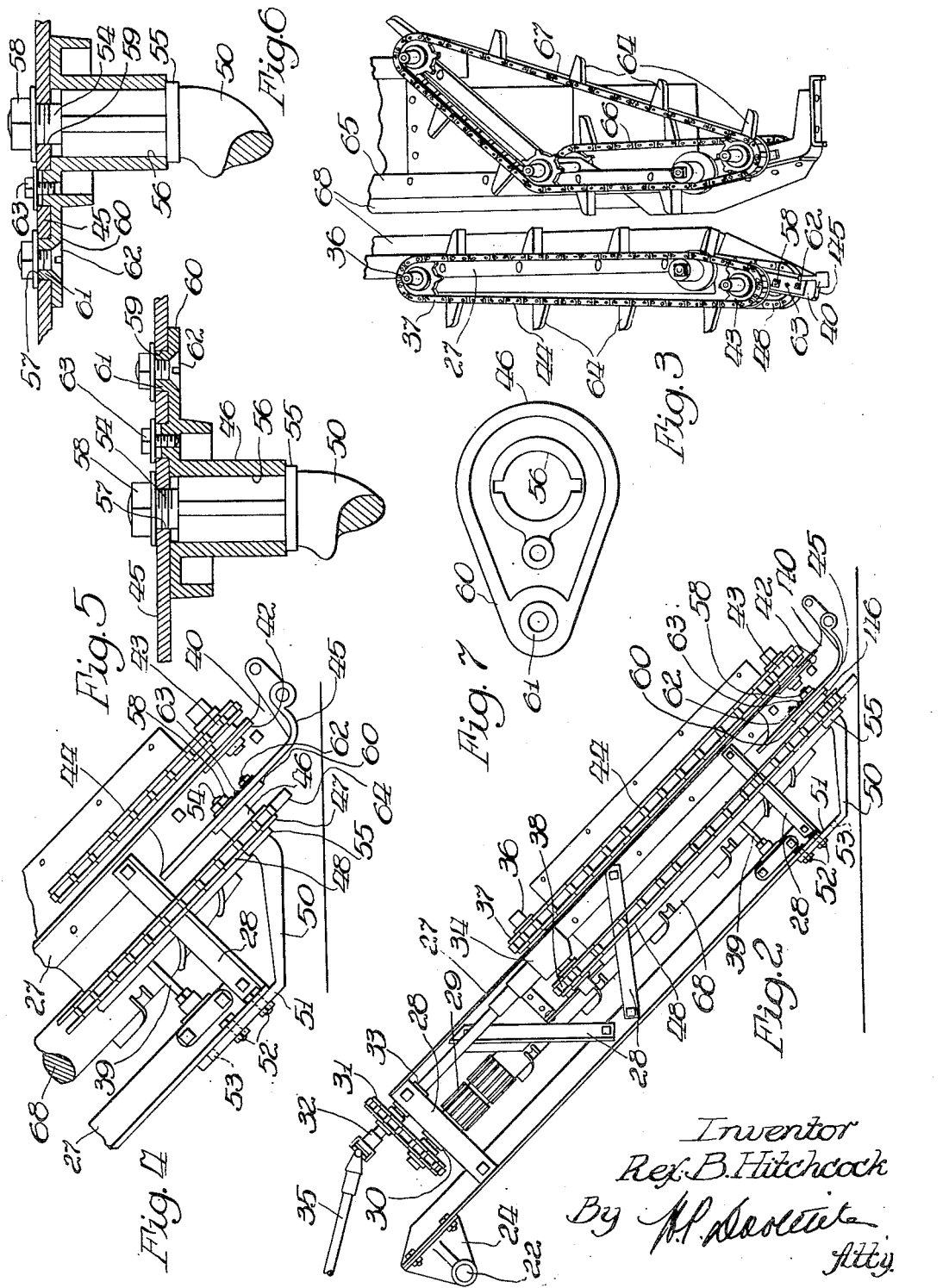
Inventor
Rex B. Hitchcock Patented Feb. 27, 1934

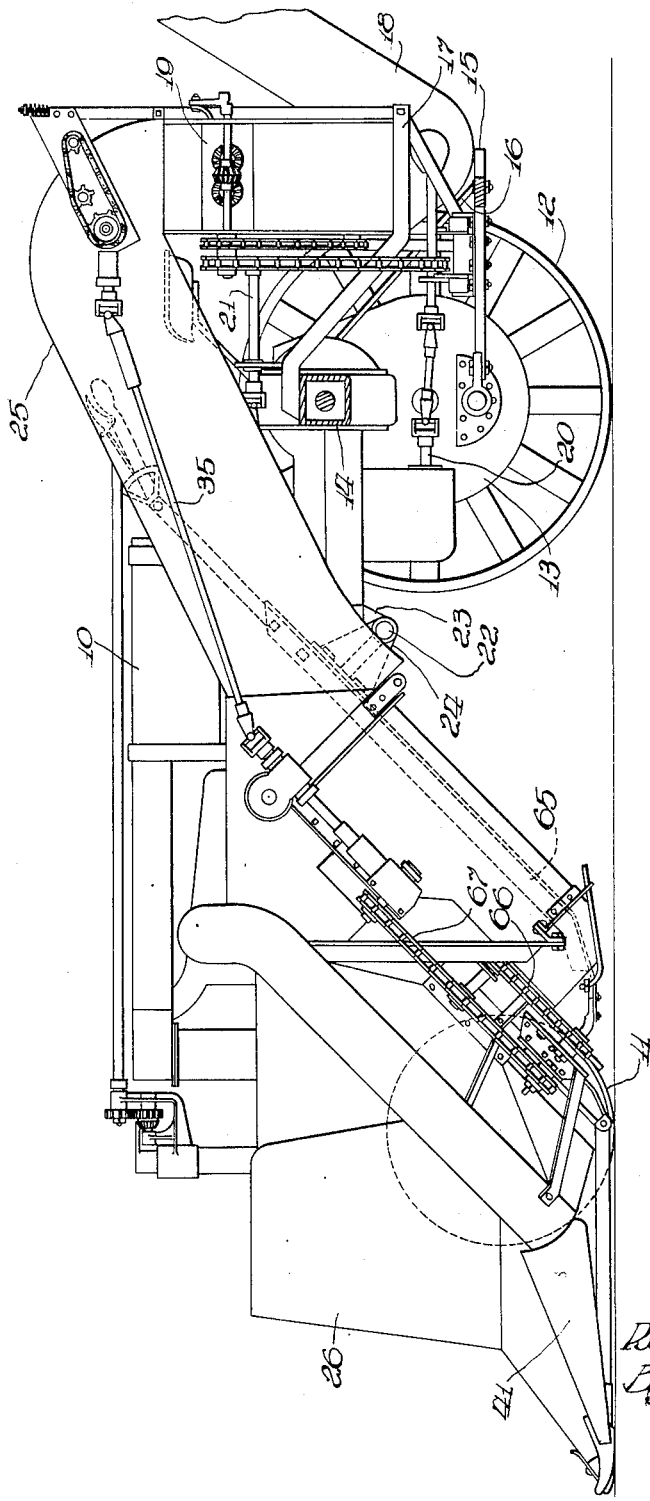

1,948,917

UNITED STATES PATENT OFFICE

1,948,917

GATHERING MEANS FOR CORN PICKERS

Rex B. Hitchcock, Croix-Wasquehal, France, assignor to International Harvester Company, a corporation of New Jersey Application April 20, 1933. Serial No. 666,970

8 Claims. (Cl. 56—18)

This invention relates to corn pickers. More particularly it relates to improvements in gathering chains and their mounting on corn pickers.

In the operation of corn pickers ground engaging shoes and dividers are used for collecting and guiding the stalks into the throat of the machine where they are engaged by the snapping rolls. To facilitate this action positively driven gathering chains are employed which extend ahead of the snapping rolls and closely adjacent the ground level. Under certain conditions it is desirable to have these chains, which are provided with fingers at spaced intervals, operate with the fingers practically digging into the soil. Under other conditions where the stalks are mostly in upright position it is not only unnecessary but undesirable to have the gathering chains running so close to the ground level. It is to meet varying conditions as described, that the improvement of the present invention was made.

The object of the present invention is to provide an adjustably mounted low gathering chain for the picking up and guiding of stalks to the throat of a corn picker.

Other objects, such as a simplified construction and a design which adapts itself to the main object of providing a low gathering chain, will be apparent from the detailed description to follow.

In the drawings:

Figure 1 is a side elevation of a conventional tricycle tractor, showing a corn picker mounted thereon, embodying the features of the present invention. The rear axle housing is broken away in section to better show the mounting of the rearwardly located parts of the picker.

Figure 2 is a side elevation of the frame structure of a picking unit embodying the invention, showing the location of the chain drives and the snapping rolls thereon;

Figure 3 is a front elevation of the same structure shown in Figure 2;

Figure 4 is an enlarged portion of the lower end of the construction shown in Figure 2, with the low gathering chain in a lifted position of adjustment;

Figure 5 is an enlarged section, showing the mounting for the low gathering chain support;

Figure 6 shows the same structure as Figure 5, with the low gathering chain support in a different position of adjustment; and Figure 7 is a plan view taken from the bottom of the adjustable securing member for the low gathering chain support, illustrated in Figures 5 and 6.

In Figure 1 a complete tractor of a conventional tricycle type, has been illustrated. Said tractor consists essentially, insofar as description is necessary in disclosing the present invention, of a narrow body 10 supported by a front rolling support 11 and rear traction wheels 12 which are mounted on depending housings 13, positioned at the ends of a transversely extending rear axle structure 14. A rearwardly extending drawbar 15 is connected to the depending housings 13 and held in a substantially horizontal position by brace rods 16. The drawbar, together with rearwardly and downwardly extending angle bars 17, provide means for supporting an elevator 18 at the rear of a tractor and husking units 19. A power takeoff shaft 20 provides the source of power for the husking unit at the rear of the tractor and through a forwardly extending driving shaft 21, furnishes power for the snapping unit located at the side of the tractor, as to be hereinafter described. A transverse shaft 22, mounted on the body of the tractor ahead of the rear traction wheels 12 in brackets 23, forms means for pivotally supporting the snapping unit.

The snapping unit consists essentially of a frame structure secured to the pivoting brackets 24. Said unit is positioned laterally of the tractor with its forward end in a position to be gauged and steered by the front rolling support of the tractor. An upwardly and rearwardly extending housing 25 covers the conveyors for delivering corn from the picker unit to the husking means at the rear of the tractor. A shield and divider 26 surrounds the forward end of the tractor and deflects stalks away from the front rolling support. The general organization, as shown in Figure 1 of these drawings, is shown in a similar picker of a two-row construction in the Glover Patent #1,806,624. The organization has been shown in this application only to illustrate an embodiment in which the low gathering chain feature of the present invention can be properly illustrated and its function properly described.

The frame structure of the picker unit previously referred to as being supported on the shaft 22 by the bearing brackets 24, includes two substantially parallel downwardly extending angle bars 27. These bars are secured in spaced relation and braced by bars 28 extending between them. The rear end of a snapping roll 29 is journalled in a bearing member 30 secured to the top bracing bar 28. Said roll is driven by a chain 31 connecting a sprocket on the roll and a sprocket on a shaft 32. Said shaft is journalled in a bearing member 33 on the frame structure and extends within the gear housing 34, also mounted on the frame structure. Power is supplied to the shaft by a rearwardly extending drive shaft 35 which may be connected to and driven by the shaft 21, previously referred to.

The gear housing 34 provides driving means by gears within the housing for a shaft 36 at right angles to the shaft 32. Chain sprockets 37 and 38 are mounted on said shaft below and above the housing.

The lower end of the snapping roll is rotatably mounted in a bearing member 39 which is thin in the axial direction of the snapping roll to reduce the non-moving part to a minimum, said roll having an extension beyond the bearing member, forming a type of roll known as the live end snapping roll. At the lower end of the upper bar 27 a bracket member 40 is rigidly secured. Said member is provided with a forwardly and upwardly extending portion which is formed to provide means for pivotally attaching a divider such as the shoe 41 shown in Figure 1. Said member is also provided with a portion 42, which provides means on which a chain sprocket 43 is mounted in driving alignment with the chain sprocket 37. The upper gathering chain 44 is mounted on these two sprockets.

The member 40 is also provided with a laterally extending lower flange 45, on which a bearing member 46 is adjustably mounted for rotatably carrying a chain sprocket 47. Said sprocket is in driving alignment with the sprocket 38, and a lower gathering chain 48 is mounted on said sprockets. A horizontally extending member 50, which forms a brace for the frame structure, a ground engaging element substantially parallel with the normal level of the ground during movement of the machine, and a support for the gathering chain bearing member 46, is adjustably mounted at the lower end of the frame structure of the picker unit. It is particularly in the construction and adjustable feature of this member that the present invention resides.

It is to be noted that the description has not given the detailed construction and relative arrangement of all the parts as the invention resides primarily in the particular construction and functioning of the low gathering chain and in the means for adjustably supporting said chain.

The member 50 has a rearwardly and upwardly extending portion 51, which is positioned parallel to the lower angle bar 27 in contact therewith, being secured by a pair of spaced bolts 52. With the member 50 in the position shown in Figure 2, that is, in its lowermost position of adjustment, an opening 53 will be seen in the member below the bolts 52. This opening is used for fastening the member in the higher position of adjustment shown in Figure 4. In this position the upper opening 53 is above the bolts 52. At its forward end the member 50 is provided with a threaded end 54 and a shoulder 55, spaced from said end. This end of the member extends non-rotatably through a bore 56 formed in a downwardly extending sleeve portion of the bearing member 46, with said sleeve portion seating against the shoulder 55. Referring to Figure 5, the threaded end also extends through an opening 57 formed in the flange 45, to which the bearing member 46 is secured. A nut 58 securely clamps the member 50 and the member 46 rigidly with respect to the flange 45.

An opening 59 of the same diameter as the opening 57, is formed in the flange 45. The member 46 carries an integral laterally extending flange 60 provided with a hollow boss 61, which fits into the opening 59. A bolt 62 extends through said hollow boss for clamping the flange against the flange 45. A cap screw 63 serves as an additional means for securing the member 46 to the flange 45. Said cap screw is located with its axes in alignment with the axes of the bolt 62 and the threaded end 54 of the member 50 and intermediate said axes. It will be understood due to the construction as described, that the member 46 may be removed from the flange 45 and swung around to the position shown in Figure 6, in which the hollow boss 61 is inserted in the opening 57, the threaded end 54 being inserted in the opening 59. This adjustment places the member 46 a considerable distance downwardly from the position shown in Figure 5.

Figure 2 shows the low gathering chain bearing member 46 and the supporting member 50 in the lower position of adjustment, as shown in Figure 6. Figure 4 shows said member in the higher position of adjustment, as shown in Figure 5. In Figures 2 and 4 one of the gathering fingers 64, which all of the gathering chains carry at spaced intervals, is shown in the lowermost position to indicate the path of travel of the fingers with respect to the ground levels, which are indicated by lines. It will be noted in Figure 2, that the gathering fingers travel very close to the normal ground level. This is a desired construction for picking up stalks which are badly grounded as is often the case following certain weather conditions. When such action is not necessary, the chain may be adjusted to the position shown in Figure 4 in order to keep it out of the ground engaging position, thereby preventing the accumulation of dirt and grit and consequent wear on the mechanism.

In the preceding description reference has been made only to the side of the picker unit shown in Figures 2 and 4. Figure 3 shows the other side of the picker unit, which differs somewhat in construction. It consists, however, essentially of a frame structure 65 which supports the driving means for the lower gathering chain 66 and the upper gathering chain 67, as well as the snapping roll 68 and the other essential parts of the mechanism. This side of the picker unit may also be provided with the same adjustable low gathering chain support or it may be provided with a conventional gathering chain.

It is to be understood that applicant has shown, in addition to a general organization, including a tractor for operating a corn picker, a specific embodiment of his improvement in low gathering chains and means for adjustably mounting same. He claims as his invention all modifications falling within the scope of the appended claims.

What is claimed is:

1. In a corn picker having a downwardly extending frame structure for supporting the snapping rolls and gathering chains, and in combination therewith a lower chain sprocket adjustably secured to the frame structure adjacent the ground level, an upper sprocket mounted above said sprocket and in driving alignment therewith, means for driving the upper sprocket and a gathering chain with outwardly extending fingers mounted on said sprockets, said fingers projecting a sufficient distance when the lower chain sprocket is in its lowermost position of adjustment to pass adjacent the ground level.

2. In a corn picker having a downwardly extending frame structure for supporting snapping rolls and gathering chains, and in combination therewith a supporting member adjustably mounted on the lower end of said frame structure, said member having a portion substantially parallel to the ground level, and an upwardly extending portion forming a bearing shaft, a chain sprocket rotatably mounted on said bearing shaft, and a downwardly extending gathering chain mounted on the frame structure, the lower end of said chain being carried by said chain sprocket.

3. In a corn picker having a downwardly extending frame structure for supporting snapping rolls, and in combination therewith a sprocket supporting member adjustably connected to the frame structure for moving it vertically with respect to the ground level, said member being formed with a bearing portion, a chain sprocket mounted on said bearing portion and a gathering chain with outwardly projecting fingers mounted on said chain sprocket, said chain being outside the frame structure with no portion of the frame structure between the chain and the ground level.

4. In a corn picker having a downwardly extending frame structure, including spaced substantially parallel frame members, and in combination therewith a sprocket supporting member having a portion positioned substantially parallel to the ground level and a portion forming a bearing for a chain sprocket, said member being adjustably supported to each of the frame members whereby it may be moved vertically relative to the ground level, a chain sprocket mounted on the bearing portion of said member, and a gathering chain supported on said sprocket, said chain having outwardly projecting fingers, the adjustment of the sprocket supporting member providing means whereby the gathering fingers may be operated closely adjacent the ground level or spaced therefrom.

5. In a corn picker having a downwardly extending frame structure, including vertically spaced substantially parallel frame members, and in combination therewith a supporting bracket rigidly secured to the upper frame member and extending adjacent the ground level, means for carrying a gathering chain sprocket adjustably mounted on said bracket, and means for adjustably securing said means to the lower frame member.

6. In a corn picker having a downwardly extending frame structure, including spaced substantially parallel frame members and spaced substantially parallel gathering chains, and in combination therewith a supporting bracket rigidly secured to the upper frame member and extending adjacent the ground level, a sprocket wheel on said bracket for carrying the upper gathering chain, means for carrying the lower gathering chain adjustably mounted on said bracket, said means including a rearward extension adjustably secured to the lower frame member.

7. In a corn picker having a downwardly extending frame structure, including vertically spaced substantially parallel frame members and spaced substantially parallel gathering chains, and in combination therewith a supporting bracket rigidly secured to the upper frame member and extending adjacent the ground level, a chain sprocket mounted on said bracket thereabove for carrying the upper gathering chain, a sprocket supporting member adjustably connected to the lower frame member, said member being formed with a bearing portion and a chain sprocket mounted on said bearing portion for supporting the lower end of the lower gathering chain.

8. In a corn picker having a downwardly extending frame structure, including vertically spaced substantially parallel frame members, a chain sprocket supporting member adjustably connected to each of said frame members, the connection with the upper member being provided by a connecting member having two reversible positions, in either of which it may be connected by the same securing menas for effecting a vertical adjustment of the chain sprocket supporting member.

REX B. HITCHCOCK.